United States Patent
McSweeney et al.

(10) Patent No.: US 8,418,483 B2
(45) Date of Patent: Apr. 16, 2013

(54) SYSTEM AND METHOD FOR CALCULATING PARAMETERS FOR A REFRIGERATION SYSTEM WITH A VARIABLE SPEED COMPRESSOR

(75) Inventors: Daniel L. McSweeney, Sidney, OH (US); Stephen M. Seibel, Celina, OH (US); Hung M. Pham, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 1022 days.

(21) Appl. No.: 12/246,927

(22) Filed: Oct. 7, 2008

(65) Prior Publication Data

US 2009/0095002 A1   Apr. 16, 2009

Related U.S. Application Data

(60) Provisional application No. 60/978,296, filed on Oct. 8, 2007, provisional application No. 60/978,258, filed on Oct. 8, 2007.

(51) Int. Cl.
*F25B 49/00* (2006.01)
(52) U.S. Cl.
USPC .................... 62/126; 62/127; 62/129; 62/227
(58) Field of Classification Search .................... 62/125, 62/126, 127, 129; 700/275, 276, 277, 278, 700/279, 280, 282, 286, 301; 702/142
See application file for complete search history.

(56) References Cited

U.S. PATENT DOCUMENTS

| | | | |
|---|---|---|---|
| 2,883,255 A | 4/1959 | Anderson | |
| 2,981,076 A | 4/1961 | Gaugler | |
| 3,082,609 A | 3/1963 | Ryan et al. | |
| 3,242,321 A | 3/1966 | Chope | |
| 3,600,657 A | 8/1971 | Pfaff et al. | |
| 4,130,997 A | 12/1978 | Hara et al. | |
| 4,280,910 A | 7/1981 | Baumann | |

(Continued)

FOREIGN PATENT DOCUMENTS

| CN | 1697954 A | 11/2005 |
|---|---|---|
| CN | 1987258 A | 6/2007 |

(Continued)

OTHER PUBLICATIONS

"Solving System of Equations by Substitution" by http://cstl.syr.edu/fipse/algebra/unit5/subst.htm; 4 pages.*

(Continued)

*Primary Examiner* — Cheryl J Tyler
*Assistant Examiner* — Paolo Gonzalez
(74) *Attorney, Agent, or Firm* — Harness, Dickey & Pierce, P.L.C.

(57) ABSTRACT

A system and method for calculating parameters for a refrigeration system having a variable speed compressor is provided. A compressor is connected to a condenser and an evaporator. An evaporator sensor outputs an evaporator signal corresponding to at least one of an evaporator pressure and an evaporator temperature. An inverter drive modulates electric power delivered to the compressor to modulate a speed of the compressor. The control module is connected to the inverter drive and receives the evaporator signal, monitors electrical power data and compressor speed data from the inverter drive, and calculates at least one of a condenser temperature and a condenser pressure based on the evaporator signal, the electrical power data, and the compressor speed data.

14 Claims, 9 Drawing Sheets

U.S. PATENT DOCUMENTS

| | | | |
|---|---|---|---|
| 4,370,564 A | 1/1983 | Matsushita |
| 4,460,861 A | 7/1984 | Rosa |
| 4,461,153 A | 7/1984 | Lindner et al. |
| 4,527,399 A | 7/1985 | Lord |
| 4,653,280 A | 3/1987 | Hansen et al. |
| 4,750,338 A | 6/1988 | Hingst |
| 4,940,929 A | 7/1990 | Williams |
| 5,056,712 A | 10/1991 | Enck |
| 5,182,918 A | 2/1993 | Manz et al. |
| 5,258,901 A | 11/1993 | Fraidlin |
| 5,269,146 A | 12/1993 | Kerner |
| 5,291,115 A | 3/1994 | Ehsani |
| 5,315,214 A | 5/1994 | Lesea |
| 5,347,467 A | 9/1994 | Staroselsky et al. |
| 5,359,276 A | 10/1994 | Mammano |
| 5,359,281 A | 10/1994 | Barrow et al. |
| 5,410,221 A | 4/1995 | Mattas et al. |
| 5,410,235 A | 4/1995 | Ehsani |
| 5,440,218 A | 8/1995 | Oldenkamp |
| 5,502,970 A | 4/1996 | Rajendran |
| 5,519,300 A | 5/1996 | Leon et al. |
| 5,603,222 A | 2/1997 | Dube |
| 5,603,227 A | 2/1997 | Holden et al. |
| 5,646,499 A | 7/1997 | Doyama et al. |
| 5,663,627 A | 9/1997 | Ogawa |
| 5,712,551 A | 1/1998 | Lee |
| 5,712,802 A | 1/1998 | Kumar et al. |
| 5,742,103 A | 4/1998 | Ashok |
| 5,786,992 A | 7/1998 | Vinciarelli et al. |
| 5,903,138 A | 5/1999 | Hwang et al. |
| 5,960,207 A | 9/1999 | Brown |
| 5,963,442 A | 10/1999 | Yoshida et al. |
| 6,005,365 A | 12/1999 | Kaneko et al. |
| 6,028,406 A | 2/2000 | Birk |
| 6,035,653 A | 3/2000 | Itoh et al. |
| 6,041,609 A | 3/2000 | Hornsleth et al. |
| 6,065,298 A | 5/2000 | Fujimoto |
| 6,073,457 A * | 6/2000 | Kampf et al. ................ 62/179 |
| 6,091,215 A | 7/2000 | Lovett et al. |
| 6,091,233 A | 7/2000 | Hwang et al. |
| 6,102,665 A | 8/2000 | Centers et al. |
| 6,116,040 A | 9/2000 | Stark |
| 6,222,746 B1 | 4/2001 | Kim |
| 6,226,998 B1 | 5/2001 | Reason et al. |
| 6,236,183 B1 | 5/2001 | Schroeder |
| 6,236,193 B1 | 5/2001 | Paul |
| 6,259,614 B1 | 7/2001 | Ribarich et al. |
| 6,281,656 B1 | 8/2001 | Masaki et al. |
| 6,281,658 B1 | 8/2001 | Han et al. |
| 6,316,918 B1 | 11/2001 | Underwood et al. |
| 6,326,750 B1 | 12/2001 | Marcinkiewicz |
| 6,344,725 B2 | 2/2002 | Kaitani et al. |
| 6,370,888 B1 | 4/2002 | Grabon |
| 6,373,200 B1 | 4/2002 | Nerone et al. |
| 6,396,229 B1 | 5/2002 | Sakamoto et al. |
| 6,404,154 B2 | 6/2002 | Marcinkiewicz et al. |
| 6,406,265 B1 | 6/2002 | Hahn et al. |
| 6,414,462 B2 | 7/2002 | Chong |
| 6,446,618 B1 | 9/2002 | Hill |
| 6,462,492 B1 | 10/2002 | Sakamoto et al. |
| 6,471,486 B1 | 10/2002 | Centers et al. |
| 6,523,361 B2 | 2/2003 | Higashiyama |
| 6,532,754 B2 | 3/2003 | Haley et al. |
| 6,539,734 B1 * | 4/2003 | Weyna ........................ 62/126 |
| 6,583,593 B2 | 6/2003 | Iijima et al. |
| 6,636,011 B2 | 10/2003 | Sadasivam et al. |
| 6,670,784 B2 | 12/2003 | Odachi et al. |
| 6,688,124 B1 | 2/2004 | Stark et al. |
| 6,698,217 B2 | 3/2004 | Tanimoto et al. |
| 6,708,507 B1 * | 3/2004 | Sem et al. ................... 62/126 |
| 6,714,425 B2 | 3/2004 | Yamada et al. |
| 6,735,284 B2 | 5/2004 | Cheong et al. |
| 6,749,404 B2 | 6/2004 | Gennami et al. |
| 6,753,670 B2 | 6/2004 | Kadah |
| 6,756,753 B1 | 6/2004 | Marcinkiewicz |
| 6,756,757 B2 | 6/2004 | Marcinkiewicz et al. |
| 6,758,050 B2 | 7/2004 | Jayanth et al. |
| 6,767,851 B1 | 7/2004 | Rokman et al. |
| 6,788,024 B2 | 9/2004 | Kaneko et al. |
| 6,815,925 B2 | 11/2004 | Chen et al. |
| 6,825,637 B2 | 11/2004 | Kinpara et al. |
| 6,828,751 B2 | 12/2004 | Sadasivam et al. |
| 6,831,439 B2 | 12/2004 | Won et al. |
| 6,876,171 B2 | 4/2005 | Lee |
| 6,915,646 B2 | 7/2005 | Kadle et al. |
| 6,955,039 B2 | 10/2005 | Nomura et al. |
| 6,966,759 B2 | 11/2005 | Hahn et al. |
| 6,967,851 B2 | 11/2005 | Yang et al. |
| 6,982,533 B2 | 1/2006 | Seibel et al. |
| 6,984,948 B2 | 1/2006 | Nakata et al. |
| 7,005,829 B2 | 2/2006 | Schnetzka |
| 7,049,774 B2 | 5/2006 | Chin et al. |
| 7,095,208 B2 | 8/2006 | Kawaji et al. |
| 7,138,777 B2 | 11/2006 | Won et al. |
| 7,154,237 B2 | 12/2006 | Welchko et al. |
| 7,176,644 B2 | 2/2007 | Ueda et al. |
| 7,184,902 B2 | 2/2007 | El-Ibiary |
| 7,208,895 B2 | 4/2007 | Marcinkiewicz et al. |
| 7,234,305 B2 | 6/2007 | Nomura et al. |
| 7,272,018 B2 | 9/2007 | Yamada et al. |
| 7,307,401 B2 | 12/2007 | Gataric et al. |
| 7,342,379 B2 | 3/2008 | Marcinkiewicz et al. |
| 7,375,485 B2 | 5/2008 | Shahi et al. |
| 7,458,223 B2 | 12/2008 | Pham |
| 7,554,271 B2 | 6/2009 | Thiery et al. |
| 7,580,272 B2 | 8/2009 | Taguchi et al. |
| 7,595,613 B2 | 9/2009 | Thompson et al. |
| 7,605,570 B2 | 10/2009 | Liu et al. |
| 7,613,018 B2 | 11/2009 | Lim et al. |
| 7,660,139 B2 | 2/2010 | Garabandic |
| 7,667,986 B2 | 2/2010 | Artusi et al. |
| 7,675,759 B2 | 3/2010 | Artusi et al. |
| 7,683,568 B2 | 3/2010 | Pande et al. |
| 7,688,608 B2 | 3/2010 | Oettinger et al. |
| 7,723,964 B2 | 5/2010 | Taguchi |
| 7,733,678 B1 | 6/2010 | Notohamiprodjo et al. |
| 7,738,228 B2 | 6/2010 | Taylor |
| 7,782,033 B2 | 8/2010 | Turchi et al. |
| 7,821,237 B2 | 10/2010 | Melanson |
| 7,895,003 B2 | 2/2011 | Caillat |
| 2001/0022939 A1 | 9/2001 | Morita et al. |
| 2002/0047635 A1 | 4/2002 | Ribarich et al. |
| 2002/0062656 A1 | 5/2002 | Suitou et al. |
| 2002/0108384 A1 | 8/2002 | Higashiyama |
| 2002/0117989 A1 | 8/2002 | Kawabata et al. |
| 2002/0157408 A1 | 10/2002 | Egawa et al. |
| 2002/0162339 A1 | 11/2002 | Harrison et al. |
| 2003/0019221 A1 * | 1/2003 | Rossi et al. ................. 62/127 |
| 2003/0077179 A1 | 4/2003 | Collins et al. |
| 2003/0085621 A1 | 5/2003 | Potega |
| 2003/0094004 A1 * | 5/2003 | Pham et al. ................. 62/126 |
| 2003/0146290 A1 | 8/2003 | Wang et al. |
| 2003/0182956 A1 | 10/2003 | Kurita et al. |
| 2004/0011020 A1 | 1/2004 | Nomura et al. |
| 2004/0061472 A1 | 4/2004 | Won et al. |
| 2004/0070364 A1 | 4/2004 | Cheong et al. |
| 2004/0085785 A1 | 5/2004 | Taimela |
| 2004/0100221 A1 | 5/2004 | Fu |
| 2004/0119434 A1 | 6/2004 | Dadd |
| 2004/0183491 A1 | 9/2004 | Sidey |
| 2004/0221594 A1 * | 11/2004 | Suzuki et al. ................ 62/236 |
| 2004/0261448 A1 * | 12/2004 | Nishijima et al. ............ 62/500 |
| 2005/0047179 A1 | 3/2005 | Lesea |
| 2005/0204760 A1 | 9/2005 | Kurita et al. |
| 2005/0235660 A1 | 10/2005 | Pham |
| 2005/0235661 A1 | 10/2005 | Pham |
| 2005/0235662 A1 | 10/2005 | Pham |
| 2005/0235663 A1 | 10/2005 | Pham |
| 2005/0247073 A1 | 11/2005 | Hikawa et al. |
| 2005/0262849 A1 | 12/2005 | Nomura et al. |
| 2005/0270814 A1 | 12/2005 | Oh |
| 2006/0041335 A9 * | 2/2006 | Rossi et al. ................. 700/276 |
| 2006/0042276 A1 | 3/2006 | Doll et al. |
| 2006/0048530 A1 | 3/2006 | Jun et al. |
| 2006/0056210 A1 | 3/2006 | Yamada et al. |
| 2006/0090490 A1 | 5/2006 | Grimm et al. |
| 2006/0117773 A1 | 6/2006 | Street et al. |

| | | | |
|---|---|---|---|
| 2006/0123809 A1 | 6/2006 | Ha et al. | |
| 2006/0130501 A1 | 6/2006 | Singh et al. | |
| 2006/0150651 A1 | 7/2006 | Goto et al. | |
| 2006/0158912 A1 | 7/2006 | Wu et al. | |
| 2006/0185373 A1 | 8/2006 | Butler et al. | |
| 2006/0187693 A1 | 8/2006 | Tang | |
| 2006/0198172 A1 | 9/2006 | Wood | |
| 2006/0198744 A1 | 9/2006 | Lifson et al. | |
| 2006/0247895 A1* | 11/2006 | Jayanth | 702/182 |
| 2006/0255772 A1 | 11/2006 | Chen | |
| 2006/0261830 A1 | 11/2006 | Taylor | |
| 2006/0290302 A1 | 12/2006 | Marcinkiewicz et al. | |
| 2007/0012052 A1 | 1/2007 | Butler et al. | |
| 2007/0029987 A1 | 2/2007 | Li | |
| 2007/0040524 A1 | 2/2007 | Sarlioglu et al. | |
| 2007/0040534 A1 | 2/2007 | Ghosh et al. | |
| 2007/0089424 A1 | 4/2007 | Venkataramani et al. | |
| 2007/0118307 A1 | 5/2007 | El-Ibiary | |
| 2007/0118308 A1 | 5/2007 | El-Ibiary | |
| 2007/0132437 A1 | 6/2007 | Scollo et al. | |
| 2007/0144354 A1 | 6/2007 | Muller et al. | |
| 2008/0089792 A1 | 4/2008 | Bae et al. | |
| 2008/0112823 A1 | 5/2008 | Yoshida et al. | |
| 2008/0143289 A1 | 6/2008 | Marcinkiewicz et al. | |
| 2008/0160840 A1 | 7/2008 | Bax et al. | |
| 2008/0209925 A1 | 9/2008 | Pham | |
| 2008/0216494 A1 | 9/2008 | Pham et al. | |
| 2008/0252269 A1 | 10/2008 | Feldtkeller et al. | |
| 2008/0265847 A1 | 10/2008 | Woo et al. | |
| 2008/0272745 A1 | 11/2008 | Melanson | |
| 2008/0272747 A1 | 11/2008 | Melanson | |
| 2008/0273356 A1 | 11/2008 | Melanson | |
| 2008/0284399 A1 | 11/2008 | Oettinger et al. | |
| 2008/0285318 A1 | 11/2008 | Tan et al. | |
| 2009/0015214 A1 | 1/2009 | Chen | |
| 2009/0015225 A1 | 1/2009 | Turchi et al. | |
| 2009/0016087 A1 | 1/2009 | Shimizu | |
| 2009/0033296 A1 | 2/2009 | Hammerstrom | |
| 2009/0039852 A1 | 2/2009 | Fishelov et al. | |
| 2009/0059625 A1 | 3/2009 | Viitanen et al. | |
| 2009/0071175 A1 | 3/2009 | Pham | |
| 2009/0091961 A1 | 4/2009 | Hsia et al. | |
| 2009/0094997 A1 | 4/2009 | McSweeney | |
| 2009/0140680 A1 | 6/2009 | Park | |
| 2009/0237963 A1 | 9/2009 | Prasad et al. | |
| 2009/0243561 A1 | 10/2009 | Tan et al. | |
| 2009/0273330 A1 | 11/2009 | Sisson | |
| 2009/0290395 A1 | 11/2009 | Osaka | |
| 2009/0295347 A1 | 12/2009 | Popescu et al. | |
| 2009/0303765 A1 | 12/2009 | Shimizu et al. | |
| 2009/0316454 A1 | 12/2009 | Colbeck et al. | |
| 2010/0007317 A1 | 1/2010 | Yang | |
| 2010/0014326 A1 | 1/2010 | Gu et al. | |
| 2010/0014329 A1 | 1/2010 | Zhang et al. | |
| 2010/0052601 A1 | 3/2010 | Pummer | |
| 2010/0052641 A1 | 3/2010 | Popescu et al. | |
| 2010/0079125 A1 | 4/2010 | Melanson et al. | |
| 2010/0080026 A1 | 4/2010 | Zhang | |
| 2010/0109615 A1 | 5/2010 | Hwang et al. | |
| 2010/0109626 A1 | 5/2010 | Chen | |
| 2010/0118571 A1 | 5/2010 | Saint-Pierre | |
| 2010/0118576 A1 | 5/2010 | Osaka | |
| 2010/0128503 A1 | 5/2010 | Liu et al. | |
| 2010/0156377 A1 | 6/2010 | Siegler | |
| 2010/0165683 A1 | 7/2010 | Sugawara | |
| 2010/0181930 A1 | 7/2010 | Hopwood et al. | |
| 2010/0187914 A1 | 7/2010 | Rada et al. | |
| 2010/0202169 A1 | 8/2010 | Gaboury et al. | |
| 2010/0226149 A1 | 9/2010 | Masumoto | |
| 2010/0246220 A1 | 9/2010 | Irving et al. | |
| 2010/0246226 A1 | 9/2010 | Ku et al. | |
| 2010/0253307 A1 | 10/2010 | Chen et al. | |
| 2010/0259230 A1 | 10/2010 | Boothroyd | |
| 2010/0270984 A1 | 10/2010 | Park et al. | |
| 2011/0138826 A1 | 6/2011 | Lifson et al. | |

FOREIGN PATENT DOCUMENTS

| | | | |
|---|---|---|---|
| JP | 55155134 A | 12/1980 | |
| JP | 61272483 A | 12/1986 | |
| JP | 01167556 | 7/1989 | |
| JP | 2004163 A | 1/1990 | |
| JP | 03129255 A | 6/1991 | |
| JP | 04344073 A | 11/1992 | |
| JP | 07035393 A | 2/1995 | |
| JP | 09196524 A | 7/1997 | |
| JP | 1998097331 | 4/1998 | |
| JP | 10153353 A | 6/1998 | |
| JP | 10160271 | 6/1998 | |
| JP | H10-153353 | 6/1998 | |
| JP | 11159895 A | 6/1999 | |
| JP | 11287497 A | 10/1999 | |
| JP | 2000297970 A | 10/2000 | |
| JP | 2001317470 A | 11/2001 | |
| JP | 2002013858 A | 1/2002 | |
| JP | 2002243246 A | 8/2002 | |
| JP | 2003156244 | 5/2003 | |
| JP | 2004135491 A | 4/2004 | |
| JP | 2005-003710 A | 1/2005 | |
| JP | 2005132167 A | 5/2005 | |
| JP | 2005282972 A | 10/2005 | |
| JP | 2006177214 A | 7/2006 | |
| JP | 2006188954 | 7/2006 | |
| JP | 2006233820 | 9/2006 | |
| JP | 2007198230 A | 8/2007 | |
| JP | 2007198705 A | 8/2007 | |
| KR | 10-1996-0024115 | 7/1996 | |
| KR | 2001-0044273 A | 6/2001 | |
| KR | 2003-0011415 A | 2/2003 | |
| KR | 2005-0059842 A | 6/2005 | |
| KR | 20050085544 A | 8/2005 | |
| KR | 20070071407 A | 7/2007 | |
| WO | 2004059822 A1 | 7/2004 | |
| WO | WO-2004083744 A1 | 9/2004 | |

OTHER PUBLICATIONS

"Electrical power vs Mechanical Power" by http://www.brighthubengineering.com/machine-design/62310-electrical-power-vs-mechanical-power/; 2 pages.*

Notice of Grounds for Rejection from the Korean Intellectual Property Office regarding Korean Patent Application No. 10-2010-7009374, dated May 31, 2011. Translation provided by Y.S. Change & Associates.

Final Office Action regarding U.S. Appl. No. 12/246,825, dated Jun. 14, 2011.

Office Action regarding U.S. Appl. No. 12/246,959, dated Jun. 21, 2011.

Final Office Action regarding U.S. Appl. No. 12/247,033, dated Jul. 12, 2011.

International Search Report regarding International Application No. PCT/US2008/011576 dated Mar. 23, 2009.

Written Opinion of the International Searching Authority regarding International Application No. PCT/US2008/011576 dated Mar. 20, 2009.

International Search Report regarding International Application No. PCT/US2008/011464 dated Mar. 13, 2009.

Written Opinion of the International Searching Authority regarding International Application No. PCT/US2008/011464 dated Mar. 13, 2009.

Non-Final Office Action regarding U.S. Appl. No. 12/246,825, dated Jan. 4, 2011.

Non-Final Office Action regarding U.S. Appl. No. 12/247,033, dated Jan. 21, 2011.

Non-Final Office Action regarding U.S. Appl. No. 12/247,001, dated Feb. 25, 2011.

Non-Final Office Action regarding U.S. Appl. No. 12/244,387, dated Mar. 3, 2011.

Notification of the First Office Action from the State Intelletual Property Office of People's Republic of China regarding Chinese Application No. 200880110551.6, dated Feb. 11, 2011. Translation provided by Unitalen Attorneys At Law.

Non-Final Office Action regarding U.S. Appl. No. 12/246,893, dated Apr. 1, 2011.

Notification of First Office Action from the State Intellectual Property Office of People's Republic of China regarding Chinese Patent Application No. 200880110665.0, dated Apr. 8, 2011. Translation provided by Unitalen Attorneys At Law.
International Preliminary Report on Patentability for International Application No. PCT/US2008/011442, dated Apr. 7, 2010.
International Preliminary Report on Patentability for International Application No. PCT/US2008/011596, dated Apr. 13, 2010.
International Preliminary Report on Patentability for International Application No. PCT/US2008/011441, dated Apr. 7, 2010.
International Preliminary Report on Patentability for International Application No. PCT/US2008/011570, dated Apr. 13, 2010.
International Preliminary Report on Patentability for International Application No. PCT/US2008/011464, dated Apr. 7, 2010.
International Preliminary Report on Patentability for International Application No. PCT/US2008/011593, dated Apr. 13, 2010.
International Preliminary Report on Patentability for International Application No. PCT/US2008/011597, dated Apr. 13, 2010.
International Preliminary Report on Patentability for International Application No. PCT/US2008/011590, dated Apr. 13, 2010.
International Preliminary Report on Patentability for International Application No. PCT/US2008/011589, dated Apr. 13, 2010.
International Preliminary Report on Patentability for International Application No. PCT/US2008/011576, dated Apr. 13, 2010.
International Search Report for International Application No. PCT/US2008/011442 dated Feb. 3, 2009.
International Search Report for International Applicatoin No. PCT/US2008/011596, dated Feb. 25, 2009.
International Search Report for International Application No. PCT/US2008/011441, dated Jan. 30, 2009.
International Search Report for International Application No. PCT/US2008/011570, dated May 26, 2009.
Written Opinion of the International Searching Authority for International Application No. PCT/US2008/011570, dated May 26, 2009.
Written Opinion of the International Searching Authority for International Application No. PCT/US2008/011593, dated Jun. 17, 2009.
International Search Report for International Application No. PCT/US2008/011593, dated Jun. 17, 2009.
Written Opinion of the International Searching Authority for International Application No. PCT/US2008/011597, dated Jun. 19, 2009.
International Search Report for International Application No. PCT/US2008/011597, dated Jun. 19, 2009.
International Search Report for International Application No. PCT/US2008/011590, dated Feb. 27, 2009.
International Search Report for International Application No. PCT/US2008/011589, dated Feb. 27, 2009.
Written Opinion of the International Searching Authority for International Application No. PCT/US2008/011442, dated Feb. 3, 2009.
Written Opinion of the International Searching Authority for International Application No. PCT/US2008/011596, dated Feb. 25, 2009.
Written Opinion of the International Searching Authority for International Application No. PCT/US2008/011441, dated Jan. 30, 2009.
Written Opinion of the International Searching Authority for International Application No. PCT/US2008/011589, dated Feb. 27, 2009.
Written Opinion of the International Searching Authority for International Application No. PCT/US2008/011590, dated Feb. 27, 2009.
Office Action regarding U.S. Appl. No. 12/246,893, dated Aug. 1, 2011.
Final Office Action regarding U.S. Appl. No. 12/244,387, dated Aug. 17, 2011.
Final Office Action regarding U.S. Appl. No. 12/247,001, dated Sep. 1, 2011.
Office Action regarding U.S. Appl. No. 12/247,020, dated Sep. 1, 2011.
Final Office Action regarding U.S. Appl. No. 12/246,959, dated Oct. 12, 2011.
Appeal Brief regarding U.S. Appl. No. 12/247,001, dated Feb. 1, 2012.
Examiner's Answer to Appellant's Appeal Brief regarding U.S. Appl. No. 12/247,001, dated Mar. 26, 2012.
Final Office Action regarding U.S. Appl. No. 12/244,416, dated Nov. 15, 2011.
Non-Final Office Action regarding U.S. Appl. No. 12/247,033, dated Jan. 19, 2012.
Notice of Appeal from the Examiner to the Board of Patent Appeals and Interferences and Pre-Appeal Brief Request for Review regarding U.S. Appl. No. 12/247,001, dated Dec. 1, 2011.
Notice of Final Rejection from the Korean Intellectual Property Office regarding Korean Application No. 10-2010-7009374, dated Nov. 18, 2011. Translation provided by Y.S. Chang & Associates.
Notice of Panel Decision from Pre-Appeal Brief Review regarding U.S. Appl. No. 12/247,001, dated Dec. 27, 2011.
Notification of First Office action from the State Intellectual Property Office of People's Republic of China regarding Chinese Patent Application No. 200880110484.8, dated Dec. 23, 2011. Translation provided by Unitalen Attorneys at Law.
Notification of First Office Action from the State Intellectual Property Office of People's Republic of China regarding Chinese Patent Application No. 200880110590.6, dated Feb. 29, 2012. Translation provided by Unitalen Attorneys at Law.
Notification of Grounds for Refusal regarding Korean Patent Application No. 10-2010-7007375, dated Dec. 7, 2011. Translation provided by Y.S. Chang & Associates.
Notification of Grounds for Refusal regarding Korean Patent Application No. 10-2010-7007581, dated Nov. 14, 2011. Translation provided by Y.S. Chang & Associates.
Notification of Grounds for Refusal regarding Korean Patent Application No. 10-2010-7007583 from the Korean Intellectual Property Office, dated Dec. 28, 2011. Translation provided by Y.S. Chang & Associates.
Notification of Grounds for Refusal regarding Korean Patent Application No. 10-2010-7009659, dated Feb. 8, 2012. Translation provided by Y.S. Chang & Associates.
Notification of the First Office Action from the State Intellectual Property Office of People's Republic of China regarding Chinese Patent Application No. 200880111091.9 dated Nov. 23, 2011. Translation provided by Unitalen Attorneys at Law.
Office Action regarding U.S. Appl. No. 12/246,825, dated Oct. 12, 2011.
Office Action regarding U.S. Appl. No. 12/244,387, dated Mar. 1, 2012.
Office Action regarding U.S. Appl. No. 12/244,416, dated Aug. 8, 2011.
Office Action regarding U.S. Appl. No. 12/246,893, dated Dec. 7, 2011.
Applicant-Initiated Interview Summary regarding U.S. Appl. No. 12/247,020, dated Sep. 6, 2012.
Final Office Action regarding U.S. Appl. No. 12/244,387, dated Aug. 13, 2012.
Final Office Action regarding U.S. Appl. No. 12/247,020, dated Jun. 6, 2012.
Final Office Action regarding U.S. Appl. No. 12/247,033, dated Jul. 5, 2012.
Non-Final Office Action regarding U.S. Appl. No. 12/246,959, dated Jun. 13, 2012.
Notification of First Office Action from the State Intellectual Property Office of People's Republic of China regarding Chinese Patent Application No. 200880110616.7, dated Jul. 4, 2012, Translation provided by Unitalen Attorneys at Law.
Notification of Grounds for Refusal regarding Korean Patent Application No. 10-2010-7006707, dated May 22, 2012. Translation provided by Y.S. Chang & Associates.
Notification of the First Office Action from the State Intellectual Property Office of People's Republic of China regarding Chinese Application No. 2008801110726, dated Jun. 5, 2012, Translation provided by Unitalen Attorneys at Law.
Notification of the Second Office Action from the State Intellectual Property Office of People's Republic of China regarding Chinese Patent Application No. 200880110665.0, dated Apr. 5, 2012. Translation provided by Unitalen Attorneys at Law.

* cited by examiner

SYSTEM AND METHOD FOR CALCULATING PARAMETERS FOR A REFRIGERATION SYSTEM WITH A VARIABLE SPEED COMPRESSOR

CROSS-REFERENCE TO RELATED APPLICATIONS

This application claims the benefit of U.S. Provisional Application No. 60/978,296, filed on Oct. 8, 2007. This application also claims the benefit of U.S. Provisional Application No. 60/978,258, filed on Oct. 8, 2007. The entire disclosures of each of the above applications are incorporated herein by reference.

FIELD

The present disclosure relates to compressors and more particularly to a system and method for calculating parameters of a refrigeration system with a variable speed compressor.

BACKGROUND

The statements in this section merely provide background information related to the present disclosure and may not constitute prior art.

Compressors may be used in a wide variety of industrial and residential applications to circulate refrigerant within a refrigeration, heat pump, HVAC, or chiller system (generically "refrigeration systems") to provide a desired heating or cooling effect. In any of the foregoing applications, the compressor should provide consistent and efficient operation to insure that the particular application (i.e., refrigeration, heat pump, HVAC, or chiller system) functions properly. A variable speed compressor may be used to vary compressor capacity according to refrigeration system load. Operating parameters of the compressor and of the refrigeration system may be used by protection, control, and diagnostic systems to insure optimal operation of the compressor and refrigeration system components. For example, evaporator temperature and/or condenser temperature may be used to diagnose, protect, and control the compressor and other refrigeration system components.

SUMMARY

A system is provided that may comprise a compressor connected to a condenser and an evaporator, an evaporator sensor that outputs an evaporator signal corresponding to at least one of an evaporator pressure and an evaporator temperature, an inverter drive that modulates electric power delivered to the compressor to modulate a speed of the compressor, and a control module connected to the inverter drive. The control module may receive the evaporator signal, monitor electrical power data and compressor speed data from the inverter drive, and calculate at least one of a condenser temperature and a condenser pressure based on the evaporator signal, the electrical power data, and the compressor speed data.

In other features, the electrical power data may include compressor current data for the compressor.

In other features, a discharge temperature sensor may output a discharge temperature signal corresponding to a temperature of refrigerant exiting the compressor and the control module may calculate a discharge superheat temperature of the compressor based on the discharge temperature signal and at least one of the calculated condenser temperature and the derived condenser pressure.

In other features, the discharge temperature sensor may comprise a thermocouple located external to the compressor on a discharge tube extending from the compressor.

In other features, the discharge temperature sensor may comprise a thermistor mounted within the compressor on a non-orbiting scroll of the compressor.

In other features, the control module may monitor at least one of an overheat condition and a flood back condition of the compressor based on the calculated discharge superheat temperature.

In other features, the control module may calculate at least one of a compressor capacity, a compressor power, an energy efficiency ratio, a compressor load, and a power consumption (Kwh/Day) based on the evaporator temperature and at least one of the condenser temperature and the condenser pressure.

In other features, a system is provided comprising a compressor connected to a condenser and an evaporator, a condenser sensor that outputs a condenser signal corresponding to at least one of a condenser pressure and a condenser temperature, a discharge temperature sensor that outputs a discharge temperature signal corresponding to a temperature of refrigerant exiting the compressor, an inverter drive that modulates electric power delivered to the compressor to modulate a speed of the compressor, and a control module connected to the inverter drive. The control module may receive the condenser signal and the discharge temperature signal, monitor electrical power data and compressor speed data from the inverter drive, and calculates at least one of an evaporator temperature and an evaporator pressure based on the condenser signal, the discharge temperature signal, the electrical power data, and the compressor speed data.

In other features, the discharge temperature sensor may comprise a thermocouple located external to the compressor on a discharge tube extending from the compressor.

In other features, the discharge temperature sensor may comprise a thermistor mounted within the compressor on a non-orbiting scroll of the compressor.

In other features, the electrical power data may include compressor current data for the compressor.

In other features, a suction temperature sensor may output a suction temperature signal corresponding to a temperature of refrigerant entering the compressor and the control module may calculate a suction superheat temperature of the compressor based on a suction temperature signal and at least one of the calculated evaporator temperature and the derived evaporator pressure.

In other features, the control module may monitor at least one of an overheat condition and a flood back condition of the compressor based on the calculated suction superheat temperature.

In other features, the control module may calculate at least one of a compressor capacity, a compressor power, an energy efficiency ratio, a compressor load, and a power consumption (Kwh/Day) based on the condenser temperature and at least one of the evaporator temperature and the evaporator pressure.

In other features, a method is provided that includes receiving a condenser signal corresponding to at least one of a condenser pressure and a condenser temperature of a condenser connected to a compressor and an evaporator, modulating a speed of the compressor with an inverter drive configured to modulate electric power delivered to the compressor, receiving electric power data and compressor speed data from the inverter drive, receiving a discharge temperature signal from a discharge temperature sensor, the discharge temperature signal corresponding to a temperature of refrigerant exiting the compressor, and calculating at least one of an evaporator temperature and an evaporator pressure based on the condenser signal, the discharge temperature signal, the electrical power data, and the compressor speed data.

In other features, the receiving the electric power data may include receiving compressor current data for the compressor.

In other features, the method may include receiving a suction temperature signal from a suction temperature sensor, the suction temperature signal corresponding to a temperature of refrigerant entering the compressor and calculating a suction superheat temperature of the compressor based on the suction temperature signal and at least one of the calculated evaporator temperature and the derived evaporator pressure.

In other features, the method may include monitoring at least one of an overheat condition and a flood back condition of the compressor based on the calculated suction superheat temperature.

In other features, the method may include calculating at least one of a compressor capacity, a compressor power, an energy efficiency ratio, a compressor load, and a power consumption (Kwh/Day) based on the condenser temperature and at least one of the evaporator temperature and the evaporator pressure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
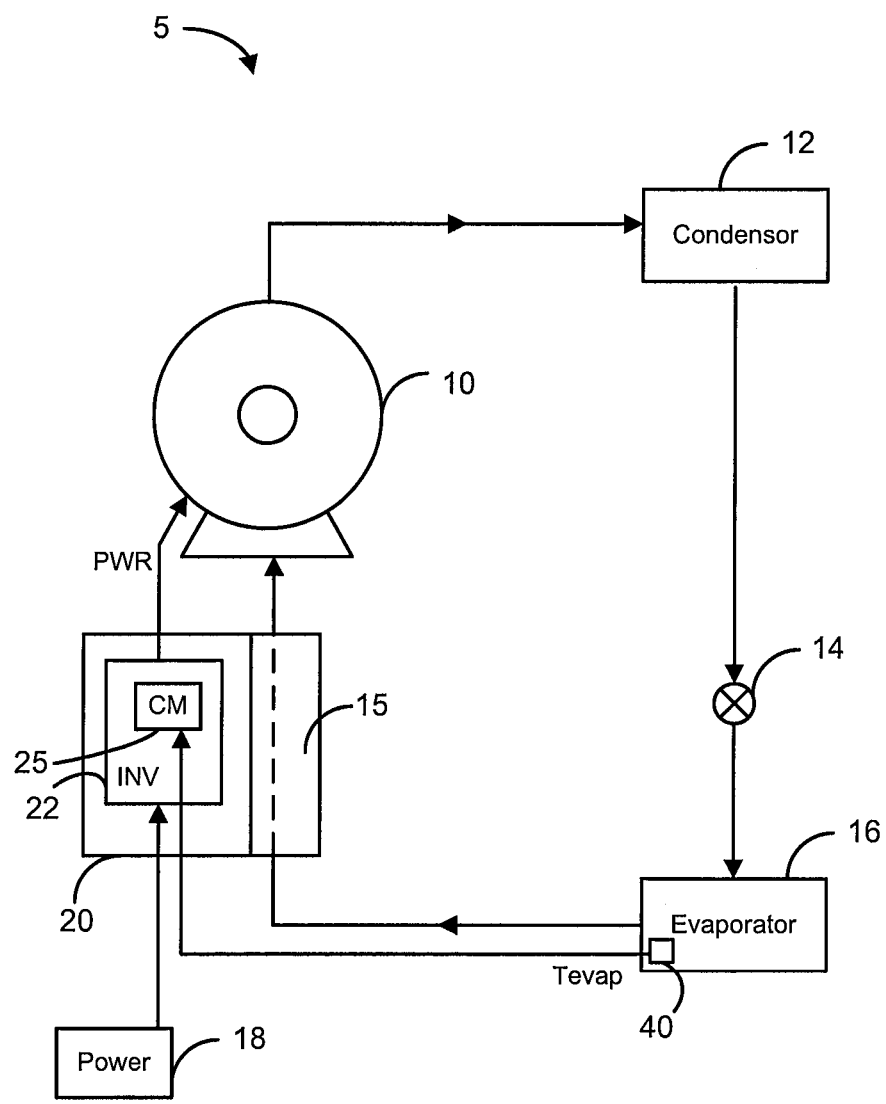
FIG. 1 is a schematic view of a refrigeration system.

The following description is merely exemplary in nature and is not intended to limit the present disclosure, application, or uses. It should be understood that throughout the drawings, corresponding reference numerals indicate like or corresponding parts and features.

As used herein, the terms module, control module, and controller refer to one or more of the following: An application specific integrated circuit (ASIC), an electronic circuit, a processor (shared, dedicated, or group) and memory that execute one or more software or firmware programs, a combinational logic circuit, or other suitable components that provide the described functionality. As used herein, computer readable medium refers to any medium capable of storing data for a computer. Computer-readable medium includes, but is not limited to, memory, RAM, ROM, PROM, EPROM, EEPROM, flash memory, CD-ROM, floppy disk, magnetic tape, other magnetic medium, optical medium, or any other device or medium capable of storing data for a computer.

With reference to FIG. 1, an exemplary refrigeration system 5 includes a compressor 10 that compresses refrigerant vapor. While a specific refrigeration system is shown in FIG. 1, the present teachings are applicable to any refrigeration system, including heat pump, HVAC, and chiller systems. Refrigerant vapor from compressor 10 is delivered to a condenser 12 where the refrigerant vapor is liquefied at high pressure, thereby rejecting heat to the outside air. The liquid refrigerant exiting condenser 12 is delivered to an evaporator 16 through an expansion valve 14. Expansion valve 14 may be a mechanical or electronic valve for controlling super heat of the refrigerant. The refrigerant passes through expansion valve 14 where a pressure drop causes the high pressure liquid refrigerant to achieve a lower pressure combination of liquid and vapor. As hot air moves across evaporator 16, the low pressure liquid turns into gas, thereby removing heat from evaporator 16. The low pressure gas is again delivered to compressor 10 where it is compressed to a high pressure gas, and delivered to condenser 12 to start the refrigeration cycle again.

Compressor 10 may be driven by an inverter drive 22, also referred to as a variable frequency drive (VFD), housed in an enclosure 20. Enclosure 20 may be near compressor 10. Inverter drive 22 receives electrical power from a power supply 18 and delivers electrical power to compressor 10. Inverter drive 22 includes a control module 25 with a processor and software operable to modulate and control the frequency of electrical power delivered to an electric motor of compressor 10. Control module 25 includes a computer readable medium for storing data including the software executed by the processor to modulate and control the frequency of electrical power delivered to the electric motor of compressor and the software necessary for control module 25 to execute and perform the protection and control algorithms of the present teachings. By modulating the frequency of electrical power delivered to the electric motor of compressor 10, control module 25 may thereby modulate and control the speed, and consequently the capacity, of compressor 10.

Inverter drive 22 includes solid state electronics to modulate the frequency of electrical power. Generally, inverter drive 22 converts the inputted electrical power from AC to DC, and then converts the electrical power from DC back to AC at a desired frequency. For example, inverter drive 22 may directly rectify electrical power with a full-wave rectifier bridge. Inverter driver 22 may then chop the electrical power using insulated gate bipolar transistors (IGBT's) or thyristors to achieve the desired frequency. Other suitable electronic components may be used to modulate the frequency of electrical power from power supply 18.

Electric motor speed of compressor 10 is controlled by the frequency of electrical power received from inverter driver 22. For example, when compressor 10 is driven at sixty hertz electric power, compressor 10 may operate at full capacity operation. When compressor 10 is driven at thirty hertz electric power, compressor 10 may operate at half capacity operation.

Control module 25 may generate data corresponding to compressor current and/or compressor power during the routines executed to modulate the electric power delivered to the electric motor of compressor 10. Control module 25 may utilize data corresponding to compressor current and/or compressor power to calculate and derive other compressor and refrigeration system parameters.

As described below and in the disclosure titled "VARIABLE SPEED COMPRESSOR PROTECTION SYSTEM AND METHOD", U.S. application Ser. No. 60/978,258, which is incorporated herein by reference, suction super heat (SSH) and discharge super heat (DSH) may be used to monitor or predict a flood back condition or overheat condition of compressor 10. Further, Tcond may be used to derive DSH. Likewise, Tevap may be used to derive SSH.

A compressor floodback or overheat condition is undesirable and may cause damage to compressor 10 or other refrigeration system components. SSH and/or DSH may be correlated to a flood back or overheating condition of compressor 10 and may be monitored to detect and/or predict a flood back or overheating condition of compressor 10. DSH is the difference between the temperature of refrigerant vapor leaving the compressor, referred to as discharge line temperature (DLT) and the saturated condenser temperature (Tcond). SSH is the difference between the temperature of refrigerant vapor entering the compressor, referred to as suction line temperature (SLT) and saturated evaporator temperature (Tevap).

Figure 6:
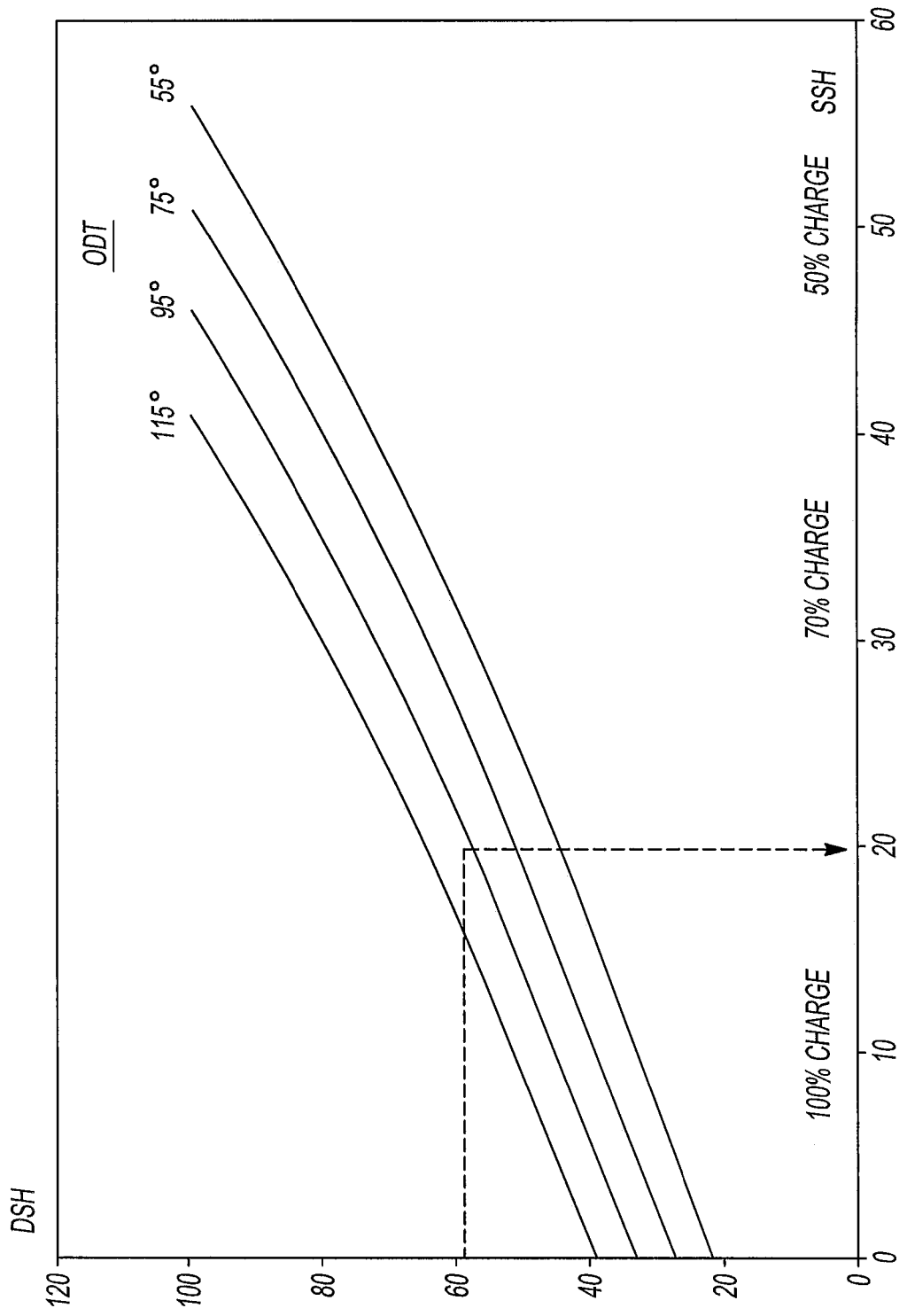
FIG. 6 is a graph showing discharge super heat correlated with suction super heat and outdoor temperature.

SSH and DSH may be correlated as shown in FIG. 6. The correlation between DSH and SSH may be particularly accurate for scroll type compressors, with outside ambient temperature being only a secondary effect. As shown in FIG. 6, correlations between DSH and SSH are shown for outdoor temperatures (ODT) of one-hundred fifteen degrees Fahrenheit, ninety-five degrees Fahrenheit, seventy-five degrees Fahrenheit, and fifty-five degrees Fahrenheit. The correlation shown in FIG. 6 is an example only and specific correlations for specific compressors may vary by compressor type, model, capacity, etc.

A flood back condition may occur when SSH is approaching zero degrees or when DSH is approaching twenty to forty degrees Fahrenheit. For this reason, DSH may be used to detect the onset of a flood back condition and its severity. When SSH is at zero degrees, SSH may not indicate the severity of the flood back condition. As the floodback condition becomes more severe, SSH remains at around zero degrees. When SSH is at zero degrees, however, DSH may be between twenty and forty degrees Fahrenheit and may more accurately indicate the severity of a flood back condition. When DSH is in the range of thirty degrees Fahrenheit to eighty degrees Fahrenheit, compressor 10 may operate within a normal range. When DSH is below thirty degrees Fahrenheit, the onset of a flood back condition may be occur. When DSH is below ten degrees Fahrenheit, a severe flood back condition may occur.

With respect to overheating, when DSH is greater than eighty degrees Fahrenheit, the onset of an overheating condition may occur. When DSH is greater than one-hundred degrees Fahrenheit, a severe overheating condition may be present.

In FIG. 6, typical SSH temperatures for exemplar refrigerant charge levels are shown. For example, as the percentage of refrigerant charge in refrigeration system 5 decreases, SSH typically increases.

As described below and in the disclosure titled "VARIABLE SPEED COMPRESSOR PROTECTION SYSTEM AND METHOD", U.S. application Ser. No. 60/978,258, which is incorporated herein by reference, Tcond may be a function of compressor power and compressor speed. Control module 25 may derive Tcond based on compressor power or current and compressor speed.

Tcond may be derived from other system parameters. Specifically, Tcond may be derived from compressor current and voltage (i.e., compressor power), compressor speed, and compressor map data associated with compressor 10. A method for deriving Tcond based on current, voltage and compressor map data for a fixed speed compressor is described in the commonly assigned application for Compressor Diagnostic and Protection System, U.S. application Ser. No. 11/059,646, Publication No. U.S. 2005/0235660. Compressor map data for a fixed speed compressor correlating compressor current and voltage to Tcond may be compressor specific and based on test data for a specific compressor type, model and capacity.

In the case of a variable speed compressor, Tcond may also be a function of compressor speed, in addition to compressor power.

Figure 7:
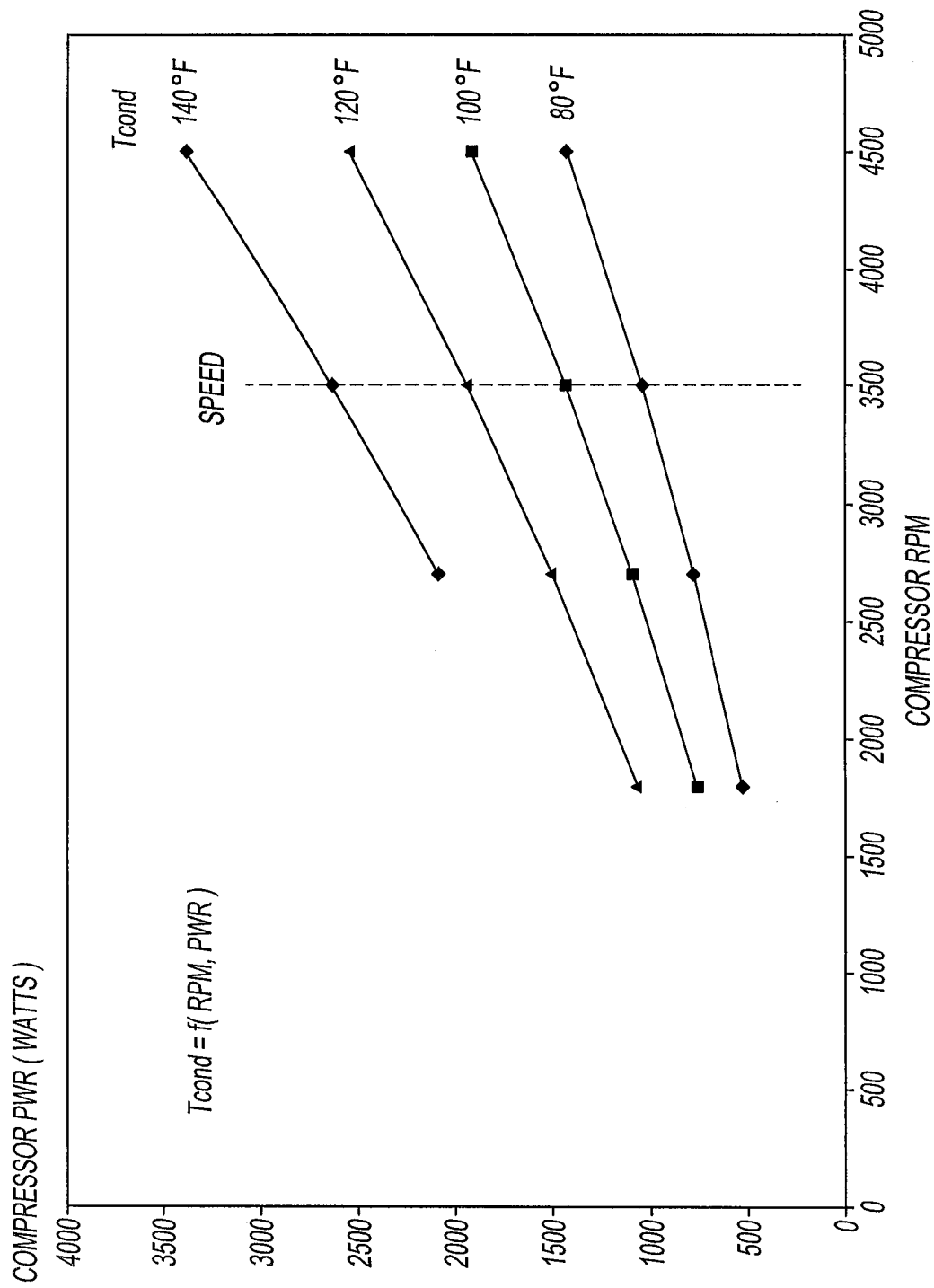
FIG. 7 is a graph showing condenser temperature correlated with compressor power and compressor speed.

A graphical correlation between compressor power in watts and compressor speed is shown in FIG. 7. As shown, Tcond is a function of compressor power and compressor speed. In this way, a three-dimensional compressor map with data correlating compressor power, compressor speed, and Tcond may be derived for a specific compressor based on test data. Compressor current may be used instead of compressor power. Compressor power, however, may be preferred over compressor current to reduce the impact of any line voltage variation. The compressor map may be stored in a computer readable medium accessible to control module 25.

In this way, control module 25 may calculate Tcond based on compressor power data and compressor speed data. Control module 25 may calculate, monitor, or detect compressor power data during the calculations performed to convert electrical power from power supply 18 to electrical power at a desired frequency. In this way, compressor power and current data may be readily available to control module 25. In addition, control module 25 may calculate, monitor, or detect compressor speed based on the frequency of electrical power delivered to the electric motor of compressor 10. In this way, compressor speed data may also be readily available to control module 25. Based on compressor power and compressor speed, control module 25 may derive Tcond.

After measuring or calculating Tcond, control module 25 may calculate DSH as the difference between Tcond and DLT. DLT data may be received by an external DLT sensor 41. Alternatively, an internal DLT sensor 30, embedded within compressor 10, may be used.

Control module 25 may use Tcond to derive other parameters including compressor capacity, power, energy efficiency ratio, load, Kwh/Day, etc.

Tcond or Tevap may be derived from other measured refrigeration system parameters. Specifically, Tcond may be derived from Tevap, compressor current, and compressor speed. Likewise, Tevap may be derived from Tcond, DLT, compressor current, and compressor speed.

As shown in FIG. 1, evaporator 16 includes an evaporator temperature sensor 40 which measures Tevap and communicates Tevap to control module 25. Alternatively, an evaporator pressure sensor may be used. As discussed below with reference to FIG. 2, a condenser temperature or pressure sensor may also be used.

Control module 25 may receive Tevap and, as described above, may receive compressor speed and compressor current data as a result of operating inverter drive 22 and modulating the frequency of power delivered to compressor 10.

Control module 25 may calculate Tcond from Tevap, compressor speed, and compressor current based on compressor map data derived from field tests for a particular compressor type, model, and capacity. The compressor map data may correlate Tcond with Tevap, compressor current, and compressor speed.

Figure 3:
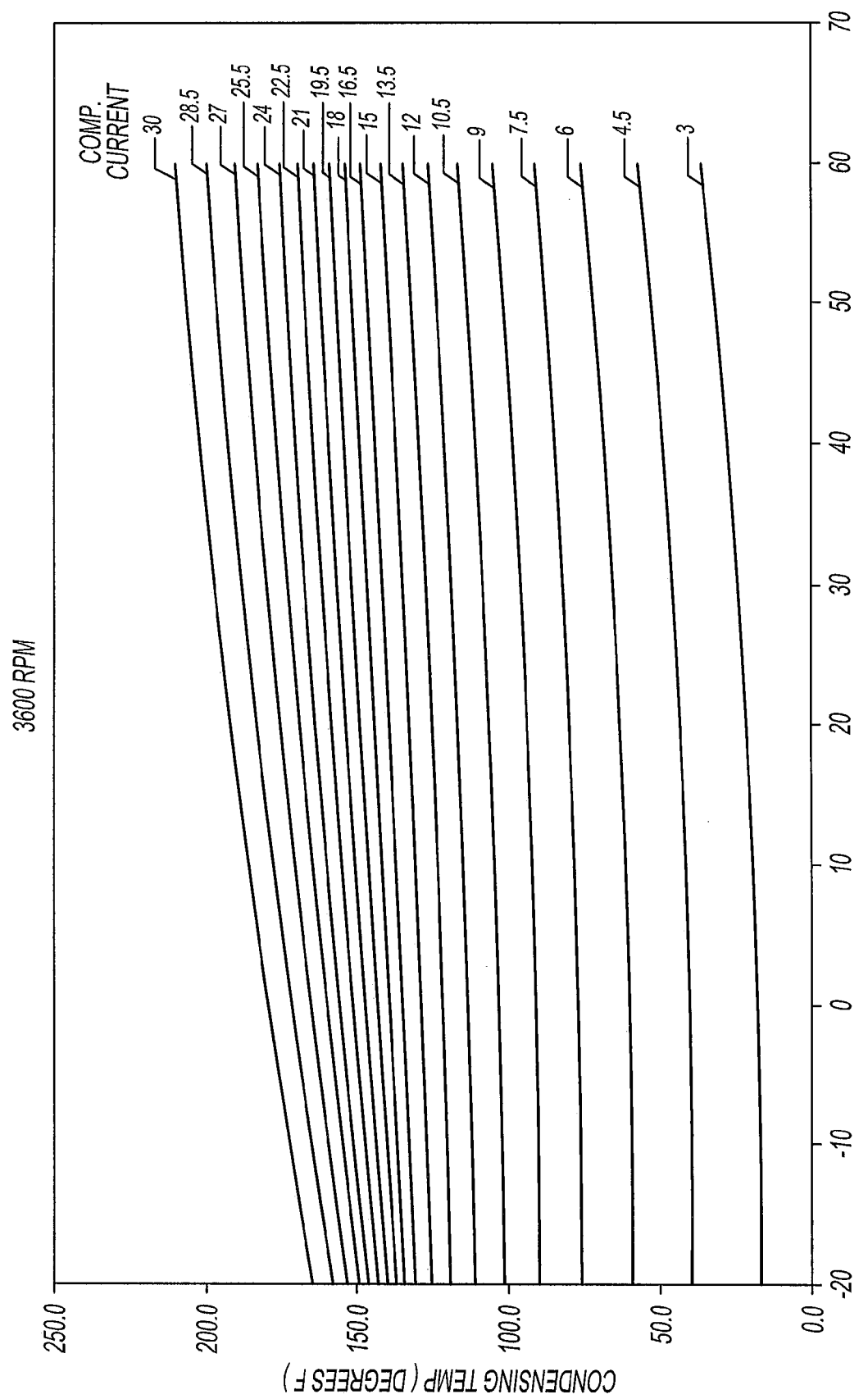
FIG. 3 is a graph of evaporator temperature and condenser temperature.
Figure 4:
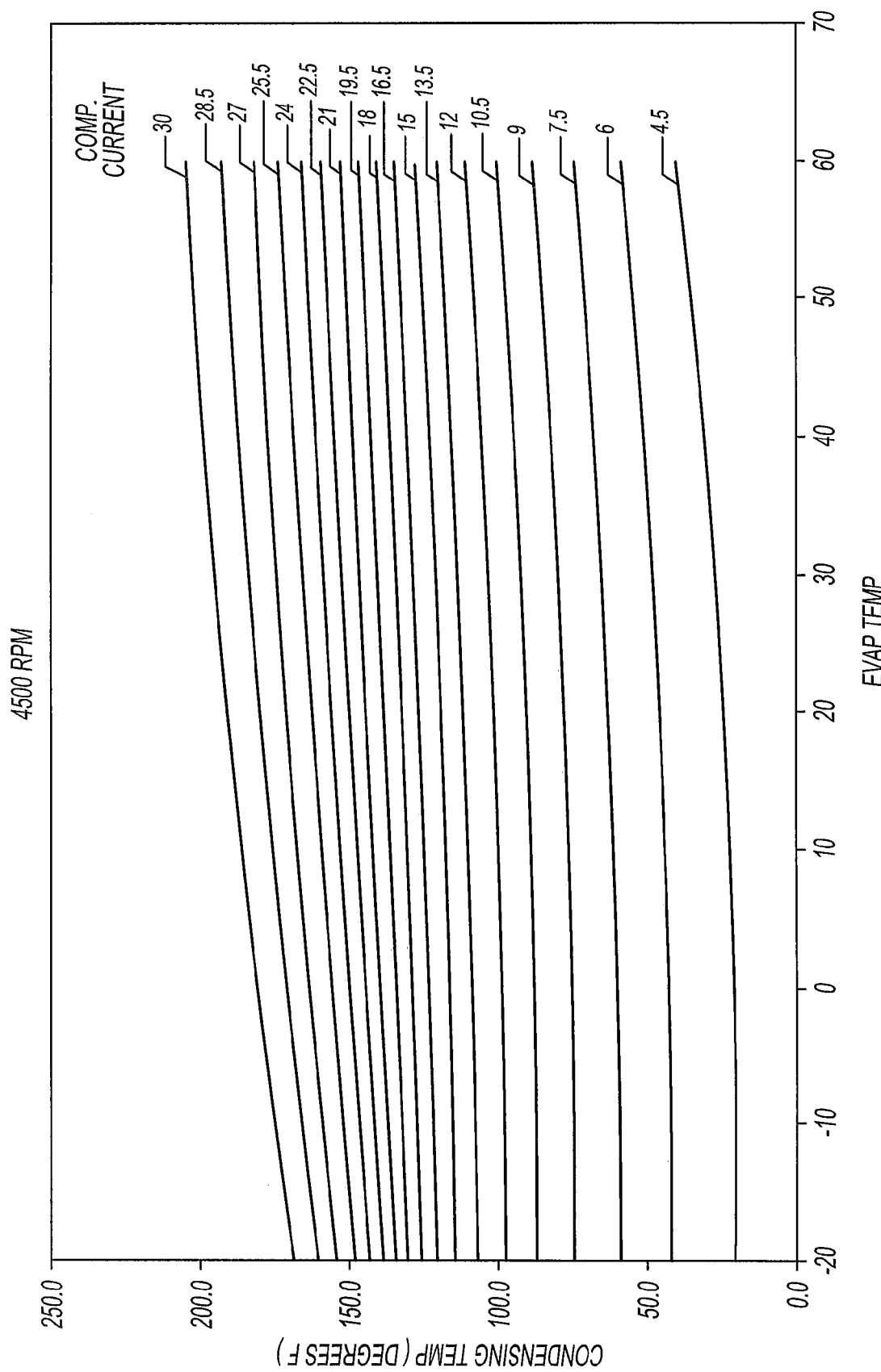
FIG. 4 is a graph of evaporator temperature and condenser temperature.
Figure 5:
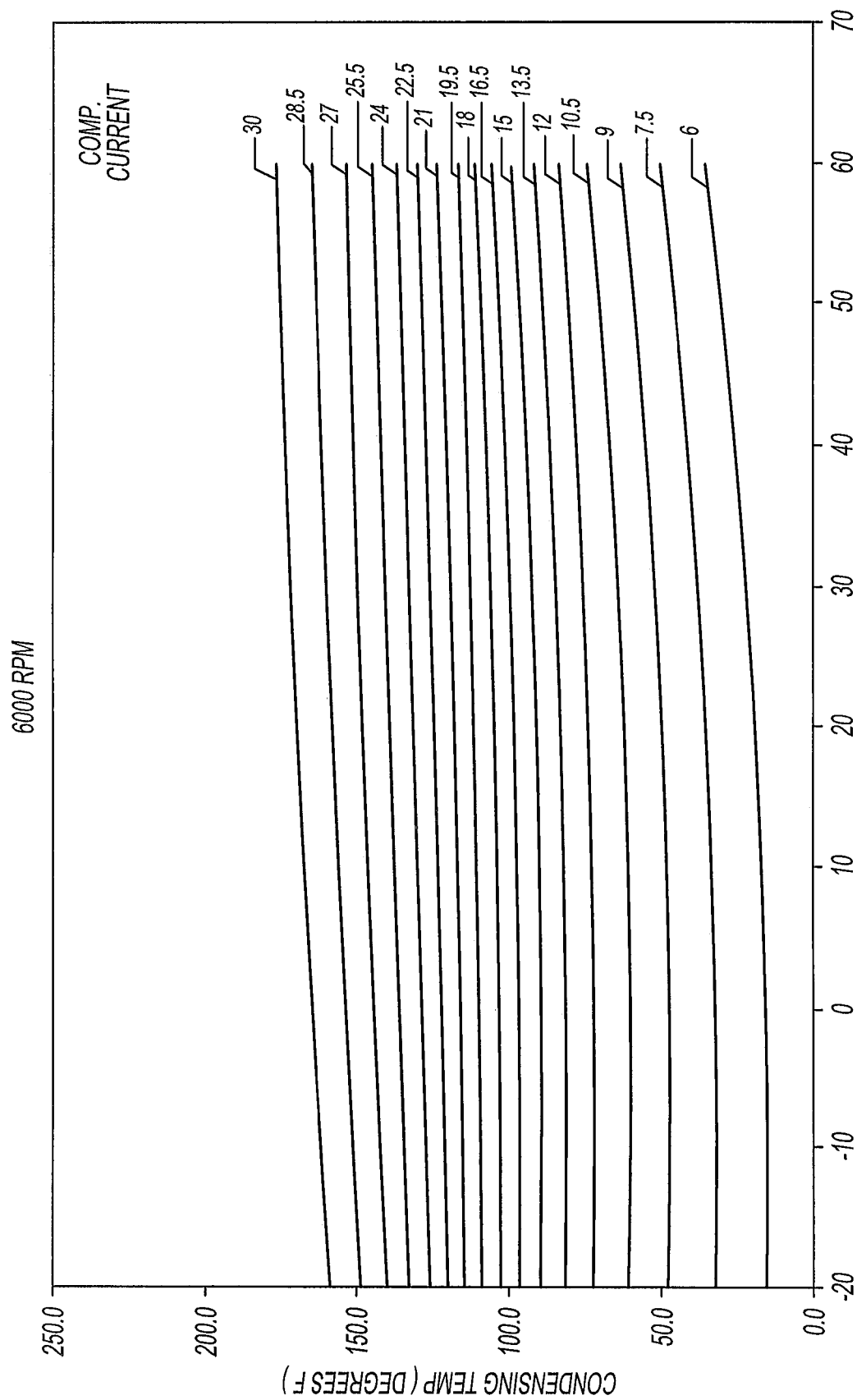
FIG. 5 is a graph of evaporator temperature and condenser temperature.

As shown in FIGS. 3, 4 and 5, Tcond is graphically correlated with Tevap and compressor current for various compressor speeds. Specifically, FIG. 3 shows Tcond related to Tevap and compressor current for compressor speed of 3600 RPM. FIG. 4 shows Tcond related to Tevap and compressor current for compressor speed of 4500 RPM. FIG. 5 shows Tcond related to Tevap and compressor current for compressor speed of 6000 RPM. FIGS. 3, 4 and 5 are exemplary. Additional compressor map data, spanning a range of compressor speeds and compressor currents may be used by control module 25 and stored in a computer readable medium accessible to control module 25.

FIGS. 3, 4 and 5 graphically relate Tcond, Tevap and various compressor currents for a particular compressor speed. For example in FIG. 4, compressor currents are shown for various amperage levels between 4.5 and 30. Corresponding Tcond vs. Tevap curves are shown for each compressor current at the compressor speed of 4500 RPM.

In this way, control module may derive Tcond from Tevap, as measured by evaporator temperature sensor 40, and compressor speed and compressor current data from operating inverter drive 22.

Figure 2:
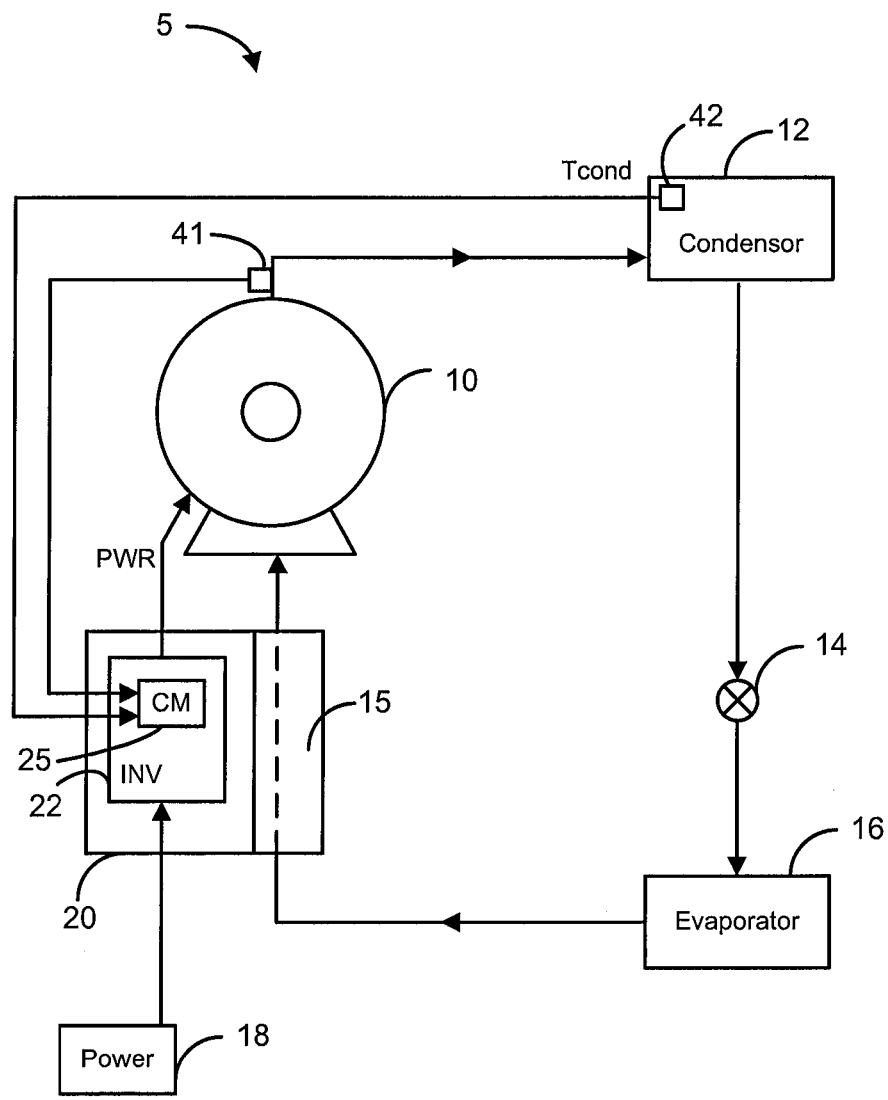
FIG. 2 is a schematic view of a refrigeration system.

As shown in FIG. 2, condenser 12 may include a condenser temperature sensor 42, which may sense Tcond and communicate Tcond to control module 25. Alternatively, a condenser pressure sensor may be used. Based on Tcond as measured by condenser temperature sensor 42, control module 25 may calculate Tevap from Tcond, DLT, compressor current, and compressor speed according to compressor map data as shown in FIGS. 3, 4 and 5, and as described above.

In this way, control module 25 may derive Tevap from Tcond, as measured by condenser temperature sensor 42, DLT as measured by DLT sensor 41, and compressor current and compressor speed data from operating inverter drive 22. Likewise, control module 25 may derive Tcond from Tevap, as measured by evaporator temperature sensor 40, and compressor current and compressor speed data from operating inverter drive 22.

Figure 8:
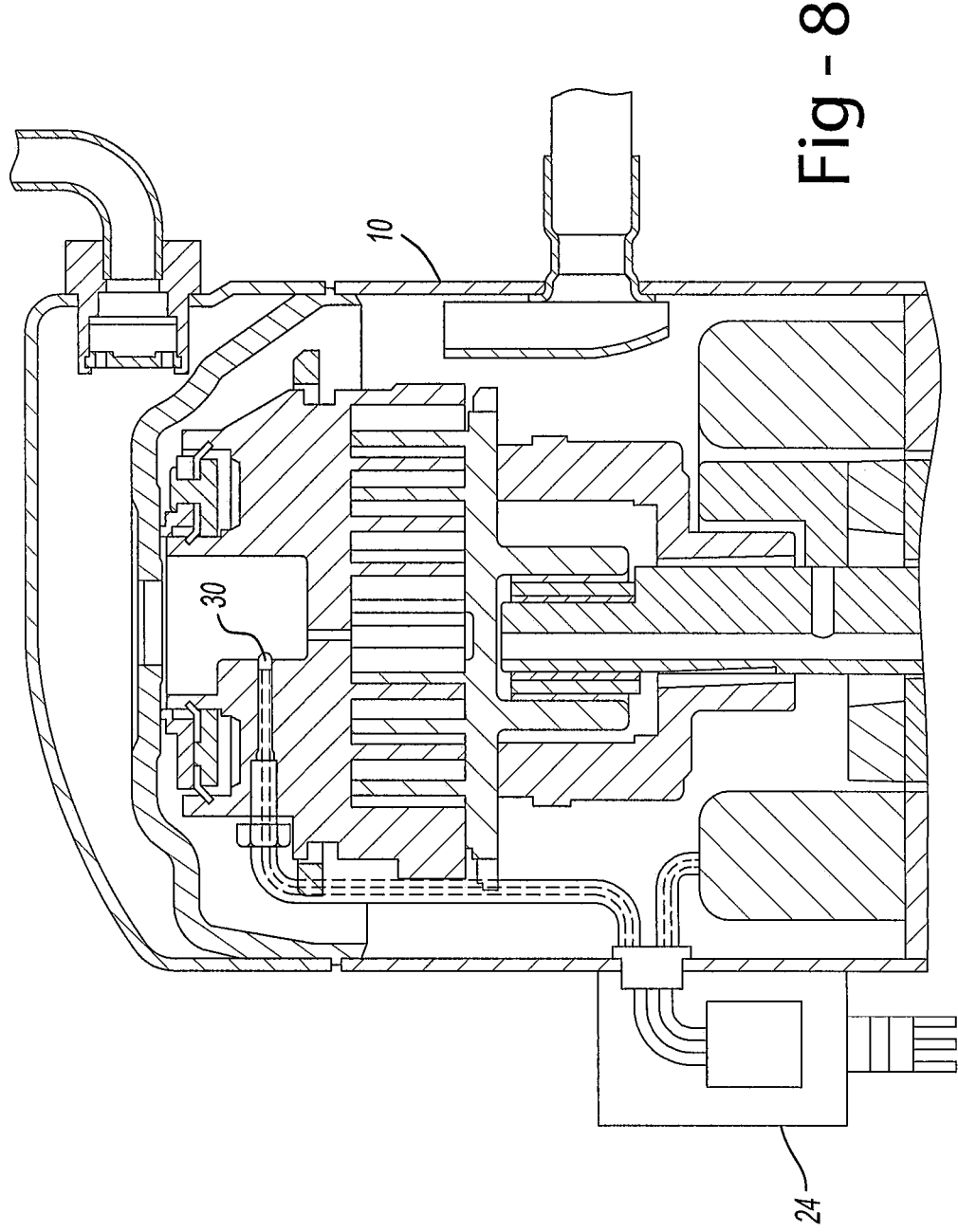
FIG. 8 is a cross-section view of a compressor.

DLT data may be received by an external DLT sensor 41. DLT sensor 41 may be a thermocouple located on the discharge tube extending from compressor 10. DLT data from DLT sensor 41 may correspond to a compressor discharge gas temperature. Alternatively, an internal DLT sensor 41, embedded within compressor 10, may be used. In other words, DLT sensor 41 may be incorporated inside compressor 10. In the case of a scroll compressor, DLT sensor 41 may be a thermistor exposed to the gas discharging from the compression mechanism and mounted on the non-orbiting scroll. The thermistor may be a positive temperature coefficient (PTC) or a negative temperature coefficient (NTC) thermistor. An internal DLT sensor, labeled as element 30, is shown in FIG. 8, mounted on the non-orbiting scroll of compressor 10.

As described above and in the disclosure titled "VARIABLE SPEED COMPRESSOR PROTECTION SYSTEM AND METHOD", U.S. application Ser. No. 60/978,258, which is incorporated herein by reference, various refrigeration system performance characteristics and data may be derived from Tcond and Tevap. Specifically, discharge super heat, suction super heat, capacity, power, energy efficiency ratio, load, and Kwh/Day may be derived from Tcond and Tevap.

Because Tevap may be calculated from mass flow, Tcond, and compressor speed, control module 25 may derive mass flow from a difference in temperature between suction gas entering cold plate 15 (Ts) and a temperature of a heat sink (Ti) located on or near inverter drive 22. Control module 25 may calculate delta T according to the following equation:

$$\text{delta } T = Ts - Ti \qquad \text{Equation 1}$$

Figure 9:
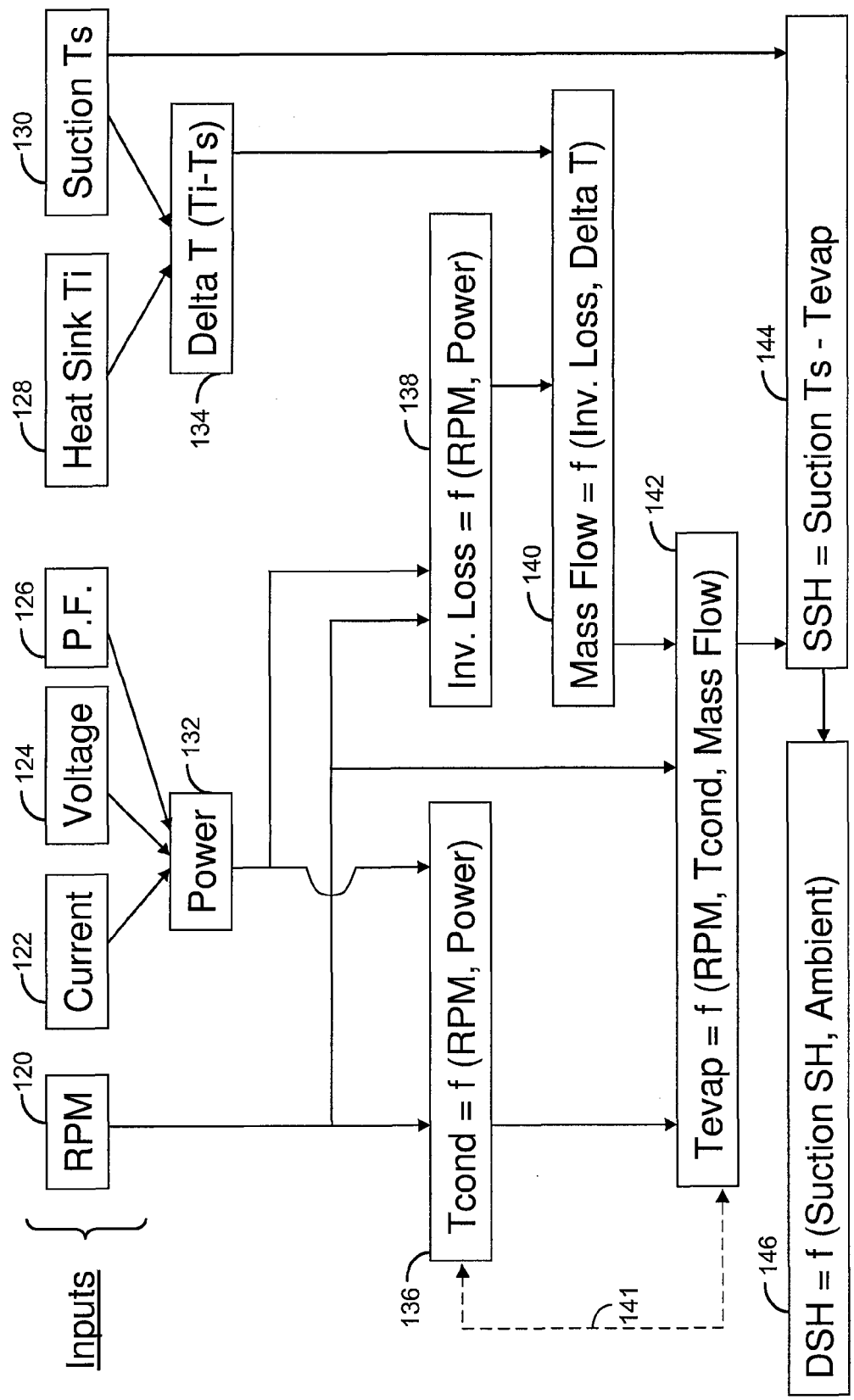
FIG. 9 is a flow chart showing derived data for a refrigeration system.

Control module 25 may determine mass flow based on delta T and by determining the applied heat of inverter drive 22. As shown in FIG. 9, mass flow may be derived based on lost heat of inverter drive 22 and delta T.

With reference to FIG. 9, inputs include compressor speed (RPM) 120, compressor current 122, compressor voltage 124, compressor power factor 126, Ti 128 and Ts 130. From compressor current 122, compressor voltage 124, and power factor 126, compressor power 132 is derived. From temperatures Ti 128 and Ts 130, delta T 134 is derived. From RPM 120 and power, Tcond 136 is derived. Also from RPM 120 and power 132, inverter heat loss 138 is derived. From inverter heat loss, and delta T 134, mass flow 140 is derived. From RPM 120, Tcond 136, and mass flow 140, Tevap 142 is derived. From Tevap 142 and Ts 130, SSH 144 is derived. From SSH 144 and ambient temperature as sensed by ambient temperature sensor 29, DSH 146 is derived. Once DSH 146 is derived, all of the benefits of the algorithms described above may be gained, including protection of compressor 10 from flood back and overheat conditions.

As shown by dotted line 141, Tcond and Tevap may be iteratively calculated to more accurately derive Tcond and Tevap. For example, optimal convergence may be achieved with three iterations. More or less iterations may also be used. Further, any of the calculated or derived variables described in FIG. 9 may alternatively be sensed or measured directly. In such the remaining variable may be calculated or derived based on the sensed or measured data.

What is claimed is:

1. A system comprising:
    a compressor connected to a condenser and an evaporator;
    a condenser sensor that outputs a condenser signal corresponding to at least one of a condenser pressure and a condenser temperature;
    a discharge temperature sensor that outputs a discharge temperature signal corresponding to a temperature of refrigerant exiting said compressor;
    an inverter drive that modulates electric power delivered to said compressor to modulate a speed of said compressor;
    a control module that is connected to said inverter drive, that receives said condenser signal and said discharge temperature signal, that monitors electrical power data and compressor speed data from said inverter drive, and that calculates at least one of an evaporator temperature and an evaporator pressure based on said condenser signal, said discharge temperature signal, said electrical power data, and said compressor speed data.

2. The system of claim 1 wherein said discharge temperature sensor comprises a thermocouple located external to said compressor on a discharge tube extending from said compressor.

3. The system of claim 1 wherein said discharge temperature sensor comprises a thermistor mounted within said compressor on a non-orbiting scroll of said compressor.

4. The system of claim 1 wherein said electrical power data includes compressor current data for said compressor.

5. The system of claim 1 further comprising a suction temperature sensor that outputs a suction temperature signal corresponding to a temperature of refrigerant entering said compressor wherein said control module calculates a suction superheat temperature of said compressor based on said suction temperature signal and at least one of said calculated evaporator temperature and said calculated evaporator pressure.

6. The system of claim 5 wherein said control module monitors at least one of an overheat condition and a flood back condition of said compressor based on said calculated suction superheat temperature.

7. The system of claim 1 wherein said control module calculates at least one of a compressor capacity, a compressor power, an energy efficiency ratio, a compressor load, and a power consumption (Kwh/Day) based on said condenser temperature and at least one of said evaporator temperature and said evaporator pressure.

8. A method comprising:
   receiving a condenser signal corresponding to at least one of a condenser pressure and a condenser temperature of a condenser connected to a compressor and an evaporator;
   modulating a speed of said compressor with an inverter drive configured to modulate electric power delivered to said compressor;
   receiving electric power data and compressor speed data from said inverter drive;
   receiving a discharge temperature signal from a discharge temperature sensor, said discharge temperature signal corresponding to a temperature of refrigerant exiting said compressor;
   calculating at least one of an evaporator temperature and an evaporator pressure based on said condenser signal, said discharge temperature signal, said electrical power data, and said compressor speed data.

9. The method of claim 8 wherein said receiving said electric power data includes receiving compressor current data for said compressor.

10. The method of claim 8 further comprising receiving a suction temperature signal from a suction temperature sensor, said suction temperature signal corresponding to a temperature of refrigerant entering said compressor, and calculating a suction superheat temperature of said compressor based on said suction temperature signal and at least one of said calculated evaporator temperature and said calculated evaporator pressure.

11. The method of claim 10 further comprising monitoring at least one of an overheat condition and a flood back condition of said compressor based on said calculated suction superheat temperature.

12. The method of claim 8 further comprising calculating at least one of a compressor capacity, a compressor power, an energy efficiency ratio, a compressor load, and a power consumption (Kwh/Day) based on said condenser temperature and at least one of said evaporator temperature and said evaporator pressure.

13. A system comprising:
   a compressor connected to a condenser and an evaporator;
   a condenser sensor that outputs a condenser signal corresponding to at least one of a condenser pressure and a condenser temperature;
   a discharge temperature sensor that outputs a discharge temperature signal corresponding to a temperature of refrigerant exiting said compressor;
   an inverter drive that modulates electric power delivered to said compressor to modulate a speed of said compressor;
   a control module that is connected to said inverter drive, that receives said condenser signal and said discharge temperature signal, that monitors electrical power data and compressor speed data from said inverter drive, and that, to protect said compressor from floodback and overheat conditions, calculates at least one of an evaporator temperature and an evaporator pressure based on said condenser signal, said discharge temperature signal, said electrical power data, and said compressor speed data.

14. A method comprising:
   receiving a condenser signal corresponding to at least one of a condenser pressure and a condenser temperature of a condenser connected to a compressor and an evaporator;
   modulating a speed of said compressor with an inverter drive configured to modulate electric power delivered to said compressor;
   receiving electric power data and compressor speed data from said inverter drive;
   receiving a discharge temperature signal from a discharge temperature sensor, said discharge temperature signal corresponding to a temperature of refrigerant exiting said compressor; and
   to protect said compressor from floodback and overheat conditions, calculating at least one of an evaporator temperature and an evaporator pressure based on said condenser signal, said discharge temperature signal, said electrical power data, and said compressor speed data.

* * * * *

UNITED STATES PATENT AND TRADEMARK OFFICE
CERTIFICATE OF CORRECTION

PATENT NO. : 8,418,483 B2  Page 1 of 1
APPLICATION NO. : 12/246927
DATED : April 16, 2013
INVENTOR(S) : Daniel L. McSweeney et al.

It is certified that error appears in the above-identified patent and that said Letters Patent is hereby corrected as shown below:

Title page

Page 3, Column 2,
Other Publications, Line 6           Delete "Y.S. Change" and insert --Y.S. Chang--.

Page 3, Column 2,
Other Publications, Line 32          Delete "Intelletual" and insert --Intellectual--.

Page 4, Column 2,
Other Publications, Line 32          Delete "Intellectural" and insert --Intellectual--.

In the Specifications

Column 1, Line 35                    Delete "insure" and insert –ensure–.

Column 3, Line 8                     Before "receiving, delete "the".

In the Claims

Column 9, Line 32                    In Claim 9, after "receiving", delete "said".

Signed and Sealed this
Third Day of September, 2013

Teresa Stanek Rea
*Acting Director of the United States Patent and Trademark Office*